Sept. 3, 1957 R. K. CADWELL 2,805,321
ELECTRICAL WELDER FOR UPRIGHT SEAMS
Filed Aug. 3, 1954 2 Sheets-Sheet 1
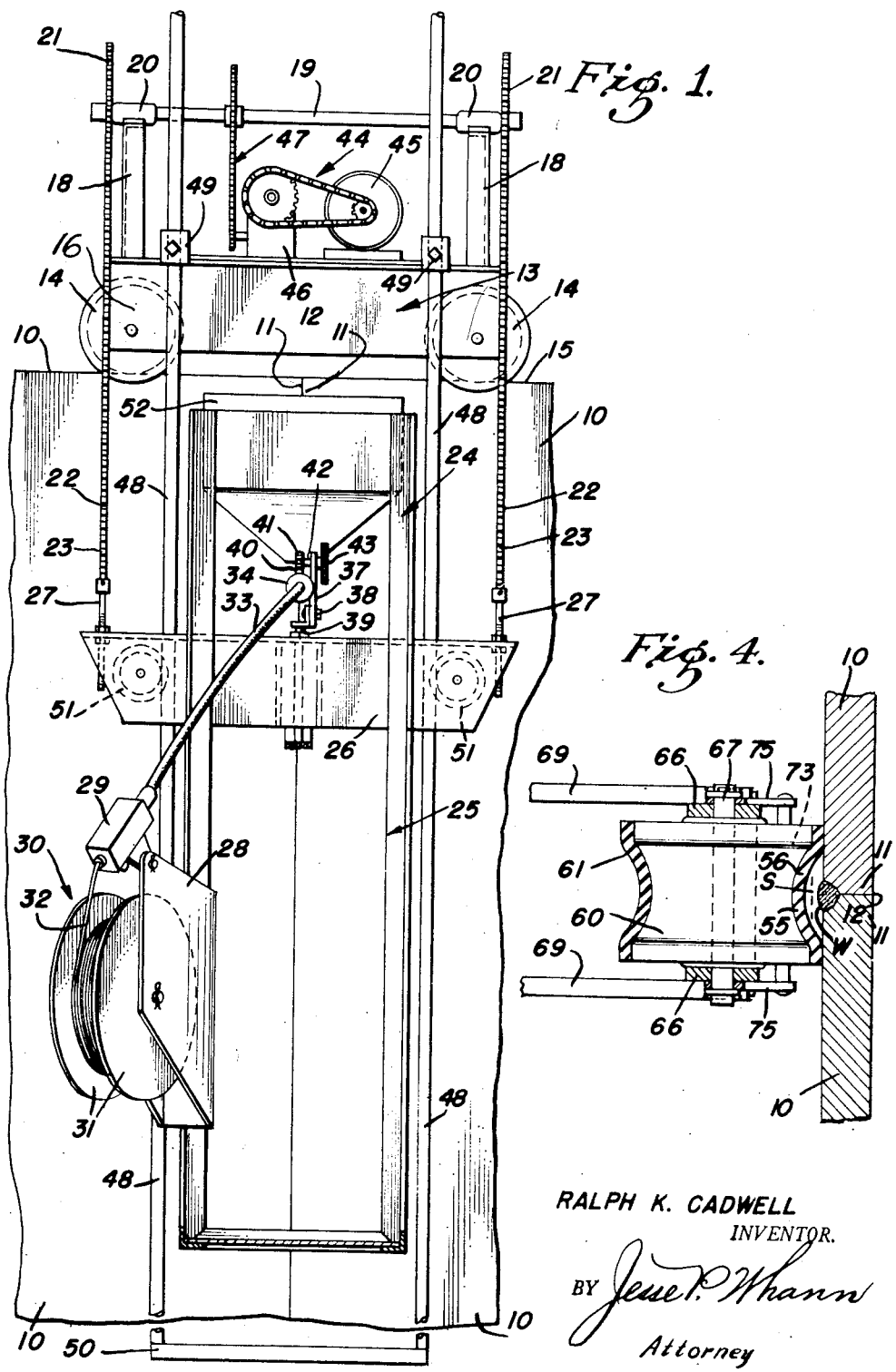
RALPH K. CADWELL
INVENTOR.
BY *Jesse P. Whann*
Attorney Sept. 3, 1957  R. K. CADWELL  2,805,321
ELECTRICAL WELDER FOR UPRIGHT SEAMS
Filed Aug. 3, 1954  2 Sheets-Sheet 2
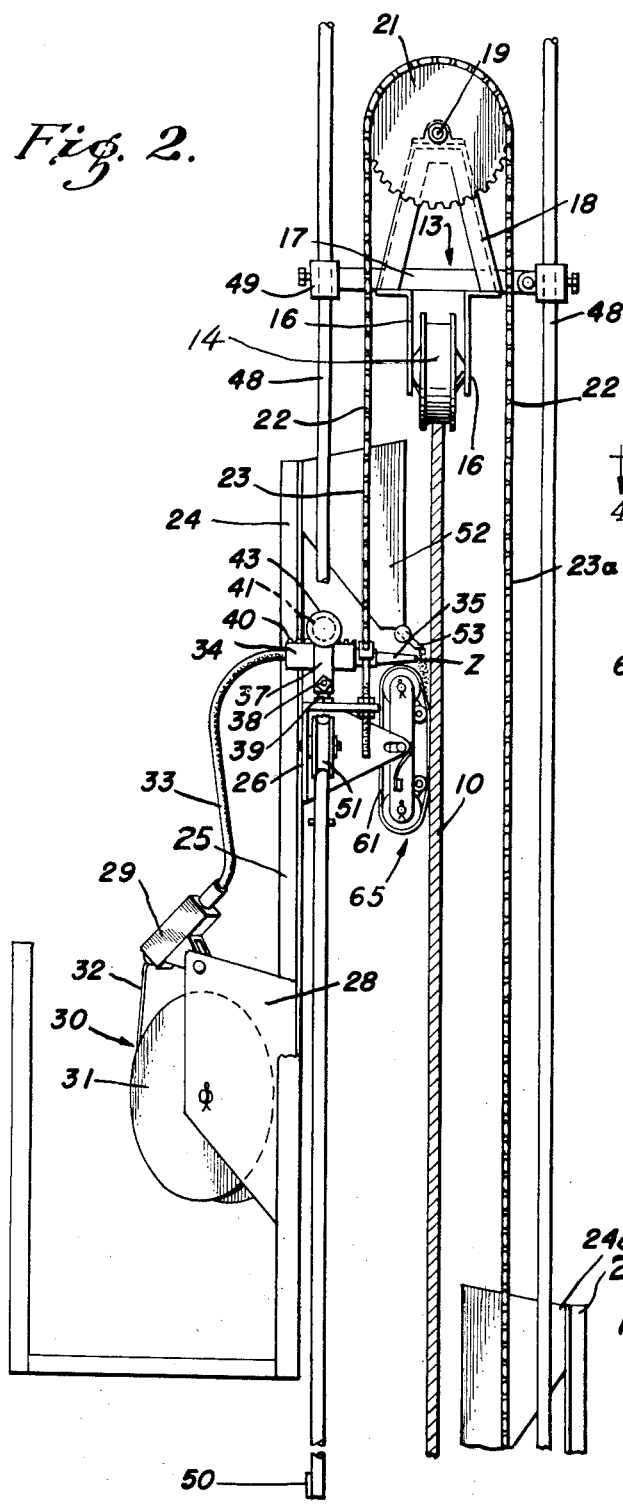
RALPH K. CADWELL
INVENTOR.
BY Jesse P. Whann
Attorney

United States Patent Office 2,805,321
Patented Sept. 3, 1957

2,805,321
ELECTRICAL WELDER FOR UPRIGHT SEAMS

Ralph K. Cadwell, Los Angeles, Calif., assignor to Lacy Manufacturing Company, Los Angeles, Calif., a corporation of California Application August 3, 1954, Serial No. 447,554

7 Claims. (Cl. 219—126)

Our invention relates to means for electrically welding a seam or joint between adjacent edges of steel plates, and relates in particular to a device for welding vertical seams by the shielded arc method of electric welding.

Herein we have employed the term "upright" with regard to the joint which is welded in order that the terminology shall include vertical joints or seams, or those which depart from true vertical position but are yet so steep as to involve the same welding problems as encountered in the welding of truly vertical joints between adjacent vertical plate edges. This type of welding is distinguished from what is termed "downhand" or welding on a surface which is nearly horizontal, or along a substantially horizontal line between plate members which are arranged with their surfaces non-horizontal or vertical.

It is an object of the invention to provide a method and apparatus for the shielded-arc electrical welding of non-horizontal or vertical joints, wherein means are provided for continuously keeping the welding arc completely submerged in a granulated flux, thereby shielding the arc from oxygen, and it is a further object of the invention to provide a means for holding the molten metal so that it will not flow from the weld by gravity, the molten metal being so held until it has cooled to non-running condition.

It is a further object of the invention to provide a device for welding upright joints between the adjacent edges of metal members, this device having a support carrying guides which are substantially parallel to the upright joint which is to be welded and means for moving an automatic electric welding device along the guides at controlled speed, there being also means for holding a flux in arc shielding position and for supporting the metal of the weld while it is in molten condition. Herein we employ the term "plates" to identify these metal members which are relatively thin in comparison to their lateral extension, but it will be understood that we intend the term to include metal members of greater thickness arranged in adjacent relation so that an upright joint is formed for reception of the shielded-arc weld.

It is a further object of the invention to provide a device of the character set forth in the preceding paragraph wherein front and back guide means are extended down from the support adjacent the front and back faces of the plates in substantially parallel relation to the joint which is to be welded, there being means for moving an automatic electric welder along each of these front and back guide means, whereby the joint is welded by front and back seams.

A further object of the invention is to provide an electric welding device for upright joints between adjacent plates having a support which is mounted on the top edges of the plates and has front and back automatic welding devices supported adjacent the front and back faces of the plates for movement parallel to the upright joint, these welders being connected and counterbalanced by a flexible member which extends from one of the welders over the support to the other welder, this arrangement enabling simultaneous welding of both the front and back faces of a vertical seam. One weld is made from top to bottom while the other is made in reverse direction.

It is a further object of the invention to provide an automatic welder for upright joints between plate members, wherein the means for holding the arc-shielding flux comprises a belt supported by wheel members, formed and arranged so that a pocket is formed adjacent the front side of the joint in surrounding relation to the arc formed between the end of the welding rod and the joint-forming edges of the plates.

It is a further object of the invention to provide an automatic welding device such as referred to in the preceding paragraph having means for preventing loss of granulated flux from the lower portion of the flux-holding pocket. It is a further object of the invention to provide means for flattening the belt as it extends downwardly from the upper wheel member, thereby closing the lower extremity of the pocket to prevent escape of flux therefrom. The belt, holding the granulated flux in the manner described in the foregoing, constitutes a means for supporting the molten metal which enters into the forming of the weld until it has cooled and congealed to such state that will not run downwardly out of its proper position in the weld.

Further objects and advantages of the invention may be brought out in the following part of the specification wherein details have been explained for the purpose of making a complete disclosure from which others may practice the invention, without the intention however, of limiting the scope of the invention which is set forth in the accompanying claims.

Referring to the accompanying drawings which are for illustrative purposes only:

Fig. 1 is a face view of a simple embodiment of the invention;

Fig. 2 is a side view of the device shown in Fig. 1, with the welded portion of the joint being shown in section;

Fig. 3 is an enlarged sectional view of that portion of Fig. 2 lying to the left of the character A;

Fig. 4 is a fragmentary sectional view taken as indicated by the line 4—4 of Fig. 3.

In Fig. 1, I show upright plates 10 disposed so that the adjacent upright edges 11 thereof will be brought together to form an upright joint 12 which is to be welded. The plates 10 and the joint 12 are referred to as being upright in position, and in the general practice of the invention they will be practically vertical. A support 13 is provided having double-flanged wheels 14 for engaging and rolling upon the upper horizontal edges 15 of the plates 10. The support 13 includes a pair of angle members 16 disposed on opposite sides of the wheels 14, spaced crossbars 17, Fig. 2, and upwardly extending brackets 18 for supporting a shamt 19 directly above the plates 10 and parallel to the upper edges 15 thereof. The shaft 19 is rotatably supported by bearings 20 mounted at the upper ends of the bracket 18. Sprockets 21 are fixed on the ends of the shaft 19 and over these sprockets chains 22 are extended so that the end portions 23 and 23a of the chain 22 extend downwardly across the front and backfaces of the plates 10. These end portions 23 and 23a respectively support front and back vertically movable welding units 24 and 24a, Figs. 1 and 2. In view of the fact that the units 24 and 24a are identical, only the upper portion of the welding unit 24a is shown, with the understanding that the unit 24a has thereon a duplicate of the equipment on the unit 24 which will be described in detail.

The unit 24 comprises a rectangular vertically elongated frame or carriage 25 having a cross member 26, the laterally projecting ends of which support screws by which connection of the frame 25 with the ends of two chains 22 is made. At one side of the frame 25 there is a bracket 28 supporting an automatic electric welding rod feeder 29 which forms an essential part of an automatic electric welder unit 30 having a reel 31 for a coiled welding rod 32 and tubular means 33 for carrying the welding rod to the zone in which the electric welding operation takes place.

The tubular member 33 has a tubular head 34 with a slender tubular tip 35 through which the arcing end 36 is fed to the work to be welded, namely, the edges 11 of the plates 10 forming the joint 12. The head 34 is carried by an adjustable bracket 37 secured by a transverse bolt 38 to a vertically adjustable screw member 39 arranged substantially centrally on the cross member 26. The bracket 37 has an opening in which the head 34 is movable toward and away from the joint 12, and means for adjusting the head toward and away from the joint is provided in the form of a rack 40 on the upper portion of the head 34 and a gear 41 to engage the rack 40, this gear 41 being fixed on a shaft 42 supported by the bracket 37 and being arranged to be rotated by a handle 43. The unit 24 is adapted to be raised and lowered by movement imparted to the chains 22, the means for providing the power to effect this movement of the carriage 24 consisting of a drive 44 comprising a motor 45 and companion reduction gear 46 mounted on the members 16 of the support 13, and a chain and sprocket drive 47 through which relatively slow rotation is transmitted from the reduction gear 46 to the shaft 19.

It will be understood that if the chains 22 are identical and of good quality, the chains themselves will constitute vertical guide means for effecting vertical movement of the units 24 and 24a. However, I have shown additional guide means for the units 24 and 24a comprising guide bars 48 extending downwardly from the attachments 49 which are secured to the front of leftward ends, Fig. 2, of the crossbars 17 of the support 13. The lower ends of the bars 48 are connected by cross member 50 and the cross member 26 of the frame 25 has thereon grooved rollers 51 arranged to roll along opposite faces of the guide bars 48 which are positioned on the support 13 so as to extend in parallel relation to the joint 12.

The upper portion of the carriage 24 has thereon a hopper 52 for a granular flux, and the lower portion of the hopper 52 is provided with a spout 53 for feeding the flux into the zone Z, Fig. 3, surrounding the end 36 of the welding rod, there being means for supporting a quantity or body 54 of the granular flux in the zone Z and in a position to cover and therefore shields against oxygen the arc which is formed between the end 36 of the welding rod and the edges 11 of the plates 10.

This means for supporting the granular flux in the zone Z comprises a vertically elongated member 55, Fig. 3, extending upwardly from the point P to the zone Z and having a portion 56 which curves away from the joint 12 and defines the lower limit of the zone Z. As shown in Figs. 3 and 4, the portion 56 of the member 55 is of arcuate cross-section so as to define a space S extending downwardly from the zone Z surrounding a portion of the weld W which extends downwardly from the zone Z, this space S containing flux in covering relation to the weld W.

In the use of the invention for welding upwardly, that portion of the member 55 extending upwardly from the point P lies against the weld which has been formed and also the edges of the plates 10. As the welding zone Z moves upwardly, adjacent portions 57 and 58 of the member 55 move consecutively over the upper portion of a grooved roller 60 toward the space S as the welding zone Z moves upwardly, thereby shifting the lower limits of the space S upwardly. The portion 61 of the member 55 adjacent the portion 61 of the member 55 adjacent the portion 58, hangs downwardly from the outer part 62 of the roller 60, and as the roller 60 moves upwardly during the progress of the welding operation, the portion 61 will travel over the upper portion of the roller 60 toward the space S which likewise shifts upwardly with the welding operation. I have shown the member 55 as being in the form of a continuous loop or belt, the lower portion of which is guided by a lower roller 63 having a cylindrical circumferential space instead of one which is grooved like the roller 60 to assist in flattening the member 55 adjacent the point P.

The rollers 60 and 63 form parts of a belt supporting carriage 64. This carriage 64 comprises a frame 65 which includes side bars 66 and transverse shafts 67 and 68 for supporting the rollers 60 and 63. The carriage 64 is supported on the carriage 24, or its counterpart 24a, by a bracket 69 having transverse slots 70 to receive a pin 71 which is supported by the side bars 66 of the carriage 64. A leaf spring 72 carried by the frame 65 of the carriage 64 and engaging the extremity of the bracket 69, urges the carriage 64 yieldably into engagement with the plates being welded and the weld. The carriage 64 has intermediate, resiliently supported rollers 73 and 74 for urging the member 55 against the plates and the weld, between the point P and the lower extremity of the space S. These rollers 73 and 74 are supported on swingable arms 75 which are urged toward the plates 10 by leaf springs 76.

In the arrangement of two vertically movable welders on opposite sides of plates to be welded, the welders serving as mutual counterweights, enable a very rapid welding upwardly and/or downwardly of the vertical seams of a tank wall since there is no requirement for shifting the welding operation back and forth from one side of the tank wall to the other. The simultaneous operation of the similar welding units 24 and 24a on opposite sides of the joint to be welded enables a rapid progress of the work.

I claim:

1. In an automatic welder for welding an upright joint between the edges of upright plates: a support having upright guide means; means for holding said support in a position adjacent the upright joint between said upright plates which is to be welded; a carriage movable on said guide means; means for moving said carriage so that it will move upwardly along said joint; a rod feeding electric welding unit mounted on said carriage and being arranged to feed a welding rod to said joint so as to weld a seam at said joint joining the edges of said plate as said carriage is moved upwardly; means for feeding a flux to the arcing end of said rod; a belt member for holding the flux in a position to shield the welding arc which is formed at the end of said welding rod; and belt supporting means mounted on said carriage for holding said belt member in a position wherein it will lie upon a portion of the weld which is being formed, said belt supporting means including a channeled upper part for supporting the upper portion of said belt member in a position to define a space in which said flux is confined around said end of said welding rod and said belt supporting means having a belt flattener below said channeled part.

2. In an automatic welder for welding a joint between the edges of upright plates: a supporting having upright guide means; means for holding said support in a position adjacent the joint between said upright plates which is to be welded; a carriage movable on said guide means; means for moving said carriage so that it will move upwardly along said joint; a rod feeding electric welding unit mounted on said carriage and being arranged to feed a welding rod to said joint so as to weld a seam at said joint joining the edges of said plate as said carriage is moved upwardly; means for feeding a flux to the arcing end of said rod; a belt member for holding the flux in a position to shield the welding arc which is formed at the end of said welding rod; and upper and lower wheel means mounted on said carriage for holding said belt member in a position wherein it will lie upon a portion of the weld which is being formed, with the upper portion of said belt member defining a space in which said flux is confined around said end of said welding rod, the uppermost of said wheel means having a channel therein so that it will hold said belt means in a manner to define a channel facing toward said weld and said end of said welding rod and the lowermost of said wheel means being adapted to flatten said belt member.

3. In an automatic welder for welding an upright joint between the edges of upright plates: a support having upright guide means in a position adjacent said joint; a carriage movable on said guide means; means for moving said carriage so that it will move along said joint; a rod feeding electric welding unit mounted on said carriage and being arranged to feed a welding rod to said joint so as to weld a seam at said joint; means for feeding a flux to the arcing end of said rod; a belt member for holding the flux in a position to shield the welding arc which is formed at the end of said welding rod; and means mounted on said carriage for holding said belt member in a position wherein it will lie upon a portion of the weld which is being formed, with the upper portion of said belt member defining a space in which said flux is confined around said end of said welding rod, said last named means comprising a frame mounted on the carriage so as to have movement toward and away from said joint, upper and lower wheel members on said frame to support said belt member, and means urging said wheel members toward said joint, the upper of said wheel members having a relatively deep circumferential channel therein and the lower of said wheel members having a circumferential face which is flatter transversely than the circumferential face of said upper wheel member so that the lower wheel member will flatten the portion of the belt member below the upper wheel member for the purpose of supporting the welding flux.

4. In an automatic welder for welding a joint between the edges of upright plates: a support extending over the upper edges of said plates, said support having front and back guide means extending respectively down the front and back faces of said plates in parallel relation to said joint; and front and back welding devices on said front and back guide members, means for connecting and counterbalancing said welding device comprising a flexible member arranged to run over the top of said support, each of said welding devices comprising a carriage movable on one of said guide members, a rod feeding electric welding unit mounted on said carriage and being arranged to feed a welding rod to said joint so as to weld a seam at said joint joining the edges of said plate as said carriage is moved along said joint, means for feeding a flux to the arcing end of said rod, a belt member for holding the flux in a position to shield the welding arc which is formed at the end of said welding rod, and means mounted on said carriage for holding said belt member in a position wherein it will lie upon a portion of the weld which is being formed, with the upper portion of said belt member defining a space in which said flux is confined around said end of said welding rod, said last named means comprising a frame mounted on the carriage so as to have movement toward and away from said joint, upper and lower wheel members on said frame to support said belt member, and means urging said wheel members toward said joint, the upper of said wheel members having a relatively deep circumferential channel therein and the lower of said wheel members having a circumferential face which is flatter transversely than the circumferential face of said upper wheel member so that the lower wheel member will flatten the portion of the belt member below the upper wheel member for the purpose of supporting the welding flux.

5. In an automatic electric welder for welding a joint between the edges of upright plates: a support extending over the upper edges of said plates; and means for supporting welding devices on the opposite sides of said joint, said means comprising front and back guides respectively extending down from said support along the front and back faces of said plate and being disposed in parallel relation to said joint, a carriage on each of said guides, each of said carriages being adapted to support an automatic electric welder, means for counterbalancing said carriages comprising a flexible member extending over said support and having its ends connected to said carriages, and means for moving said carriages along said guides as the welding operation progresses.

6. In means for automatically electrically welding an upright joint between the edges of upright plates by use of a plurality of automatic welding devices: a support extending over the upper edges of said plates; and means on said support and extending downwardly therefrom for supporting the welding devices adjacent the front and back faces of said plates, said means comprising front and back upright guides respectively extending down from said support along the front and back faces of said plates in parallel relation to said joint, and means for moving the electrical welding devices respectively on said guides as the joint welding operation progresses, said last named means comprising a wheel mounted on said support, a flexible member extending over said support and having the ends thereof extending downwardly and being connected respectively to said welding devices so as to support the same in counterbalanced relation, and means for driving said wheel so as to move said flexible member and said welding devices.

7. In means for automatically welding an upright joint between the edges of upright plates; a support engaging and extending over the upper edges of said plates; a flexible member carried by said support with the ends thereof hanging on the opposite sides of said plates; electric welders connected to the hanging portions of said flexible member in counterbalanced relation; and means for effecting lengthwise movement of said flexible member so that the hanging portions of said flexible member and said welders will be moved upwardly and downwardly on opposite sides of said plates.

References Cited in the file of this patent

UNITED STATES PATENTS

| 1,821,410 | Taylor | Sept. 1, 1931 |
| 1,947,300 | Mayoh | Feb. 13, 1934 |
| 2,395,723 | Chmielewski | Feb. 26, 1946 |
| 2,529,812 | Peters | Nov. 14, 1950 |
| 2,638,524 | Meyer et al. | May 12, 1953 |
| 2,673,916 | Meyer et al. | Mar. 30, 1954 |
| 2,677,036 | Meyer et al. | Apr. 27, 1954 |
| 2,678,987 | Talley | May 18, 1954 |
| 2,698,891 | Meyer et al. | Jan. 4, 1955 |
| 2,713,106 | Arnold | July 12, 1955 |

FOREIGN PATENTS

| 1,069,042 | France | Feb. 10, 1954 |